(12) United States Patent
Matsuo et al.

(10) Patent No.: US 8,602,661 B2
(45) Date of Patent: Dec. 10, 2013

(54) HOUSING-INTEGRATED OPTICAL SEMICONDUCTOR COMPONENT AND MANUFACTURING METHOD THEREOF

(75) Inventors: Wataru Matsuo, Shizuoka-ken (JP); Kazuya Ikegaya, Shizuoka-ken (JP); Tatsuzo Torii, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 708 days.

(21) Appl. No.: 12/674,768

(22) PCT Filed: Aug. 22, 2008

(86) PCT No.: PCT/JP2008/002273
§ 371 (c)(1),
(2), (4) Date: Feb. 23, 2010

(87) PCT Pub. No.: WO2009/028159
PCT Pub. Date: Mar. 5, 2009

(65) Prior Publication Data
US 2011/0164850 A1 Jul. 7, 2011

(30) Foreign Application Priority Data
Aug. 24, 2007 (JP) ................ P2007-217708

(51) Int. Cl.
*G02B 6/36* (2006.01)
*H01L 21/00* (2006.01)
(52) U.S. Cl.
USPC .................................. 385/93; 438/25
(58) Field of Classification Search
USPC ............................... 385/93; 438/25
See application file for complete search history.

(56) References Cited

U.S. PATENT DOCUMENTS

| 4,410,469 A | 10/1983 | Katagiri et al. |
| 5,545,893 A | 8/1996 | Brown et al. |
| 5,973,862 A | 10/1999 | Hashizume |
| 6,309,566 B1 | 10/2001 | Müller et al. |
| 6,341,898 B1 | 1/2002 | Matsushita |

(Continued)

FOREIGN PATENT DOCUMENTS

| CN | 1204171 A | 1/1999 |
| EP | 0 053 483 A2 | 6/1982 |

(Continued)

OTHER PUBLICATIONS

English-language translation of the Notice of Ground for Rejection mailed from the Korean Intellectual Property Office on May 26, 2011, in corresponding Korean Patent Application No. 10-2010-7003996.

(Continued)

*Primary Examiner* — Ryan Lepisto
*Assistant Examiner* — Jerry Blevins
(74) *Attorney, Agent, or Firm* — Finnegan, Henderson, Farabow, Garrett & Dunner, L.L.P.

(57) ABSTRACT

In a manufacturing method of a housing-integrated optical semiconductor component, an optical device (26, 27) is packaged on a lead frame (24, 25) having a leg portion (28), and a periphery of the optical device (26, 27) is sealed by an optically transmissive material, whereby an optical semiconductor component (22) is manufactured. Thereafter, a housing (23) is integrally molded to the optical semiconductor component (22) so that the housing (23) covers a portion (30) of the optical semiconductor component, which is sealed by the optically transmissive material.

12 Claims, 4 Drawing Sheets

(56) References Cited

U.S. PATENT DOCUMENTS

| | | |
|---|---|---|
| 2006/0088252 A1 | 4/2006 | Althaus et al. |
| 2008/0085084 A1* | 4/2008 | Galeotti et al. ............... 385/94 |
| 2008/0123198 A1 | 5/2008 | Fujita |

FOREIGN PATENT DOCUMENTS

| | | | |
|---|---|---|---|
| EP | 1 031 860 A2 | 8/2000 | |
| EP | 1 391 763 A1 | 2/2004 | |
| JP | 58-111008 | 7/1983 | |
| JP | 4-2179 | 1/1992 | |
| JP | 04002179 A * | 1/1992 | ............... 385/31 |
| JP | 4-177883 | 6/1992 | |
| JP | 04177883 A * | 6/1992 | ............... 385/31 |
| JP | 11-204837 | 7/1999 | |
| JP | 2001-59922 | 3/2001 | |
| JP | 2001059922 A * | 3/2001 | ............... 385/33 |
| JP | 2003-84174 | 3/2003 | |
| JP | 2003-131085 | 5/2003 | |
| JP | 2006-251762 | 9/2006 | |

OTHER PUBLICATIONS

International Search Report from the European Patent Office in International Application No. PCT/JP2008/002273 mailed Dec. 19, 2008.

Official communication issued by Chinese Patent Office, dated Dec. 5, 2012 for counterpart China Patent Application No. 20088014174.5 (7 pages).

English translations of official communication issued by Chinese Patent Office, dated Dec. 5, 2012 for counterpart Chinese Patent Application No. 200880104174.5 (9 pages).

* cited by examiner

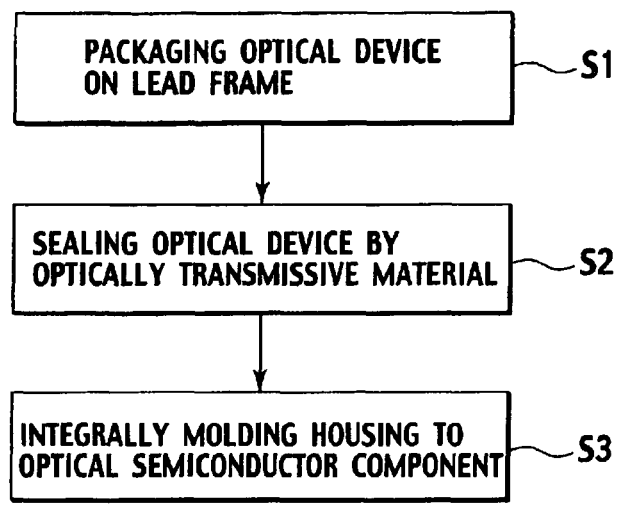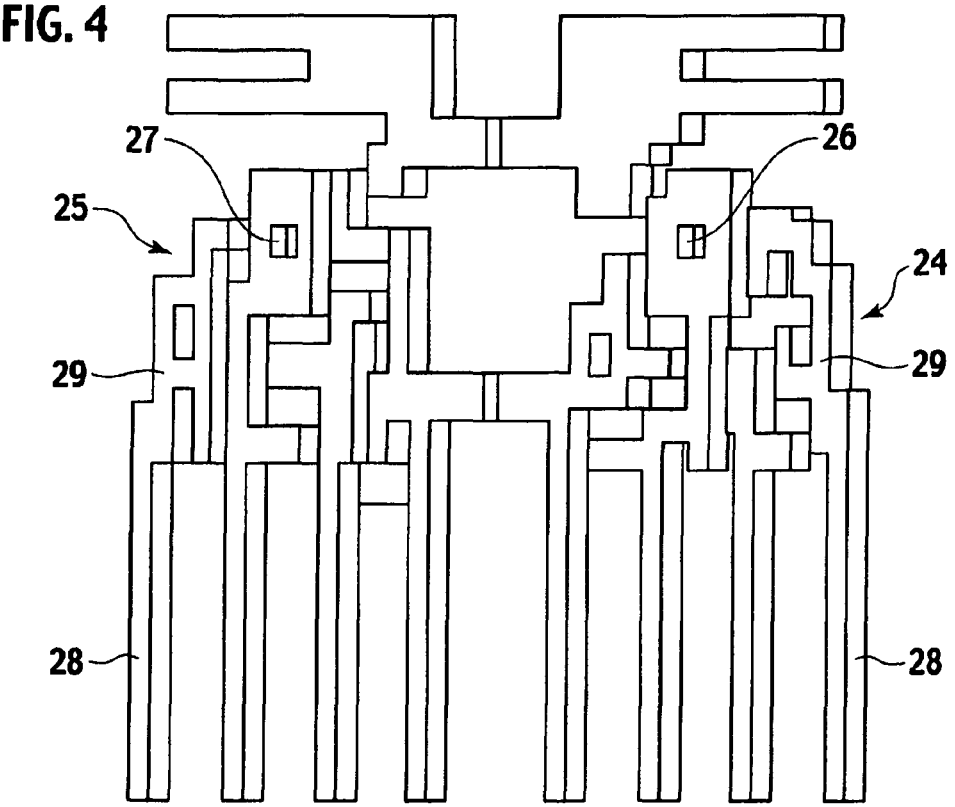

HOUSING-INTEGRATED OPTICAL SEMICONDUCTOR COMPONENT AND MANUFACTURING METHOD THEREOF

TECHNICAL FIELD

The present invention relates to an optical semiconductor component for an optical connector and to a manufacturing method thereof, specifically, relates to a housing-integrated optical semiconductor component with which a housing is integrated, and to a manufacturing method thereof.

BACKGROUND ART

FIG. 1 shows an optical connector 1 disclosed in the Patent Citation 1 as described below. The optical connector 1 is a hybrid connector of a pig-tail type, and is composed so as to be attached to a board (not shown). The optical connector 1 includes: a connector housing 2; a plurality of PCB terminals 3; a ferrule housing 4; a cover 5; a spring 6; a pair of sleeves 7; a pair of light guide members 8; an FOT case 9; a holder 10; a light emitting-side FOT (Fiber Optic Transceiver) 11 and a light receiving-side FOT 12; and a shield case 13.

The FOT case 9 is formed into a housing shape. The light emitting-side FOT 11 and the light receiving-side FOT 12 are optical semiconductor components having optical devices. The light emitting-side FOT 11 and the light receiving-side FOT 12 are inserted into the rear of the FOT case 9 with the housing shape, and are assembled and fixed thereto.

Patent Citation 1: Japanese Patent Laid-Open Publication No. 2006-251762

DISCLOSURE OF INVENTION

Technical Problem

In recent years, it has been required that information with a larger volume than heretofore be communicated at a high speed. In order to satisfy the requirement for such a high-speed and large-volume communication, it is known to utilize optical communications. However, an optical device (for example, LD: laser diode) used in the optical communication requires high positional accuracy for light thereto. In general, in order to obtain the high positional accuracy, packaging of the optical semiconductor component is performed by using active alignment. However, such a process as the active alignment has had some disadvantages that a high expense is involved therein, and in addition, that a device configuration becomes complicated, and the like.

The optical connector 1 of Patent Citation 1 has a positioning structure for deciding positions of the light emitting-side FOT 11 and the light receiving-side FOT 12 with respect to the FOT case 9. Hence, these are assembled with the FOT case 9 with good accuracy by the positioning structure, and accordingly, are free from the necessity of using the active alignment. However, from a viewpoint of a dimensional tolerance, it is sometimes difficult to obtain much higher positional accuracy by means of the positioning structure.

The present invention has been made in consideration for the above-described circumstances. It is an object of the present invention to provide a housing-integrated optical semiconductor component in which it becomes possible to obtain the high positional accuracy, and to provide a manufacturing method thereof.

Technical Solution

The present invention has been made in order to solve the above-described problem. A first aspect of the present invention provides a manufacturing method of a housing-integrated optical semiconductor component, which includes the steps of: packaging an optical device on a lead frame having a leg portion; forming an optical semiconductor component by sealing a periphery of the optical device by an optically transmissive material; and thereafter integrally molding a housing to the optical semiconductor component so that the covers the sealed portion of the optical semiconductor component formed in the sealing step.

Moreover, in the manufacturing method of a housing-integrated optical semi-conductor component according to the present invention, it is preferable that the optically transmissive material is silicone having a smaller product of a bending modulus thereof and a linear expansion coefficient thereof than that of an epoxy resin, and that a material of the housing is a liquid crystal polymer.

A second aspect of the present invention provides a housing-integrated optical semi-conductor component which includes: an optical semiconductor component having: a lead frame with a leg portion; an optical device packaged on the lead frame; and an optical device sealing portion that seals a periphery of the optical device by an optically transmissive material; and a housing integrally molded to the optical semiconductor component, the housing having a hole through which lights from/to the optical device pass, and covering the optical device sealing portion.

Moreover, in the housing-integrated semiconductor component of the present invention, it is preferable that the optically transmissive material is silicone having a smaller product of a bending modulus thereof and a linear expansion coefficient thereof than that of an epoxy resin, and that a material of the housing is a liquid crystal polymer.

Advantageous Effects

In accordance with the present invention, the optical semiconductor component and the housing are integrated with each other by molding. Since the optical semiconductor component and the housing are not integrated with each other by the positioning structure, positional accuracy of the component is not influenced by a dimensional tolerance thereof. Hence, high positional accuracy is obtained, whereby the high-speed and large-volume communication is enabled.

In accordance with the present invention, the silicone is used for sealing the periphery of the optical device. Comparing with an epoxy resin for example, the silicone can relieve a stress applied to a wire of the optical device packaged on the lead frame, the stress being caused by heat shrinkage of the silicone concerned. Moreover, in accordance with the present invention, the liquid crystal polymer is used for molding the housing. The liquid crystal polymer has low melt viscosity, and has an advantage of being capable of setting, to be low, an injection pressure at the time of molding the housing. Hence, it becomes possible to set the gate at the optimum position.

BRIEF DESCRIPTION OF THE DRAWINGS

FIG. 3 is a flowchart according to the manufacturing method of the housing-integrated optical semiconductor component of the present invention.

FIG. 4 is a perspective view of a lead frame.

BEST MODE FOR CARRYING OUT THE INVENTION

A description will be made below while referring to FIGS. 2 to 5.

Figure 1:
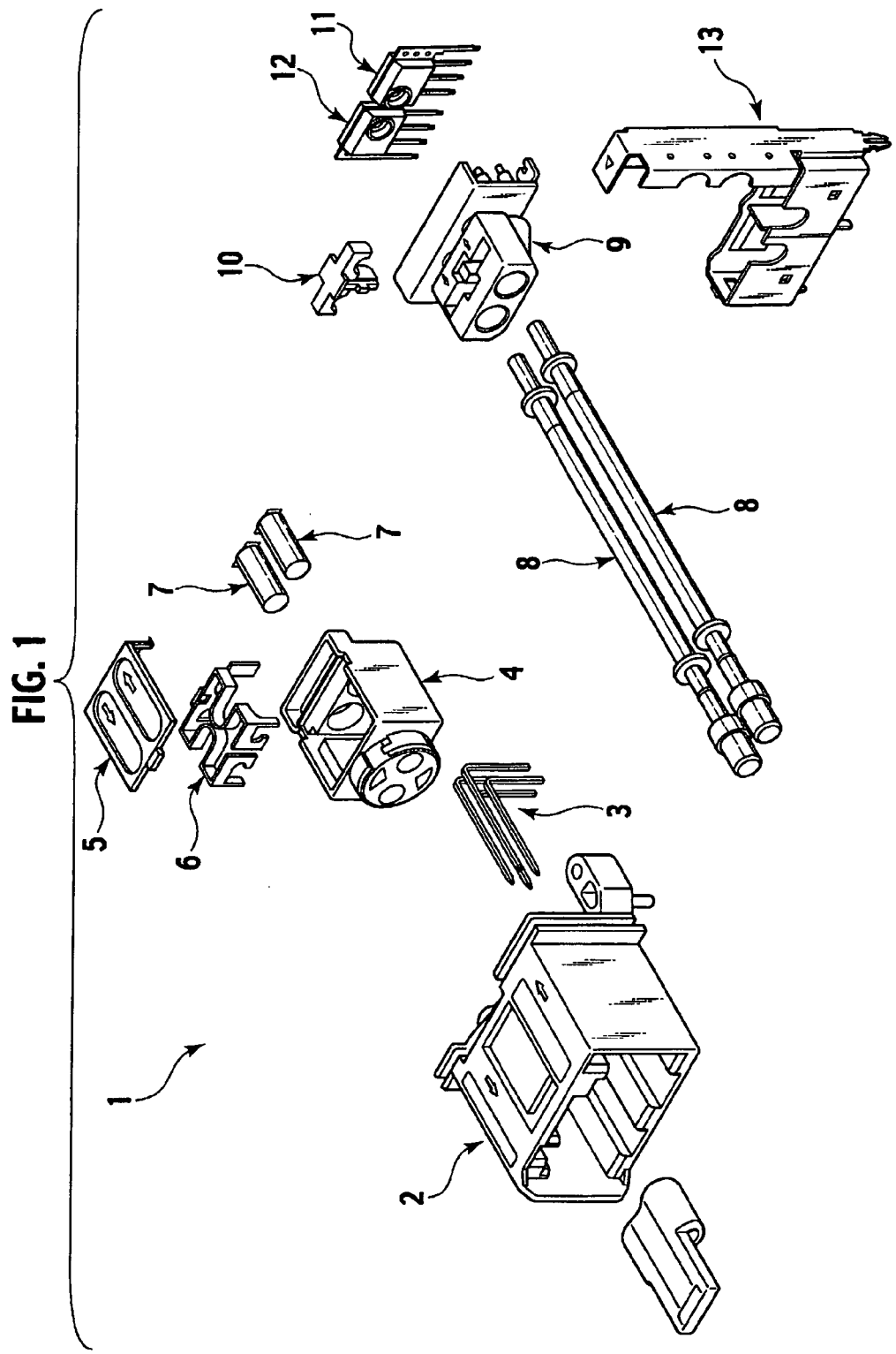
FIG. 1 is an exploded perspective view of an optical connector of a conventional example.
Figure 2A:
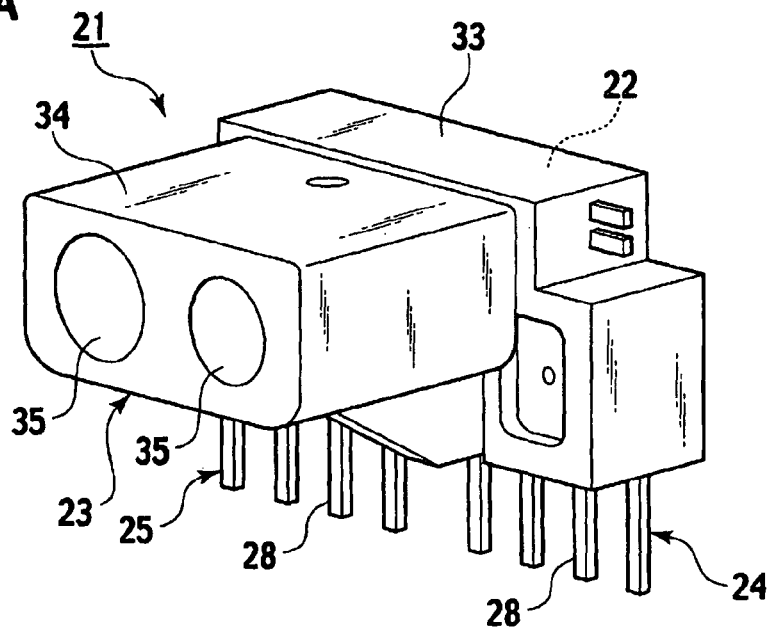
FIG. 2A is a perspective view of a housing-integrated optical semiconductor component according to an embodiment of a manufacturing method of the present invention.

As shown in FIG. 2A, a housing-integrated optical semiconductor component 21 is manufactured by integrally molding a housing 23 to an optical semiconductor component 22. The housing-integrated optical semiconductor component 21 singly corresponds to the three components shown in the conventional example (refer to FIG. 1), that is, the light emitting-side FOT 11 and the light receiving-side FOT 12, which are the optical semiconductor components, and the FOT case 9 with the housing shape, in a state before being assembled to a board (not shown).

As shown in FIG. 3, the housing-integrated optical semiconductor component 21 is manufactured by a manufacturing process of an optical semiconductor component, which includes the step of packaging an optical device on a lead frame (Step S1), and the step of sealing a periphery of the optical device by an optically transmissive material (Step S2), and by the step of integrally molding a housing (Step S3), which is performed after manufacturing the optical semiconductor component. In the optical semiconductor component, a portion thereof sealed by the optically transmissive material is covered with the housing. As described above, the housing-integrated optical semiconductor component 21 is manufactured by such integral molding.

Lead frames 24 and 25 are formed, for example, into a shape as shown in FIG. 4 by stamping a metal plate having conductivity by a press process or by etching the metal plate. The optical devices (for example, one is an LD (laser diode), and the other is a PD (photodiode)) 26 and 27 are packaged respectively on predetermined positions of the lead frames 24 and 25. For the optical devices 26 and 27, wire bonding is implemented using an Au wire and the like.

The lead frames 24 and 25 have leg portions (pins) 28, and optical device packaging portions 29 located above the leg portion 28. Tip ends of the leg portions 28 are inserted into the board (not shown), and are soldered to a circuit pattern on the board. Note that, though FIG. 4 shows four leg portions 28 provided on each of the lead frames 24 and 25, the number of leg portions 28 is not limited to that shown in this drawing.

After the optical devices 26 and 27 are packaged on the respective optical device packaging portions 29, the entireties of the respective optical device packaging portions 29 are sealed by the optically transmissive material. For example, the optical devices 26 and 27 are put into a first metal mold (not shown), the material concerned is filled into the first metal mold, and an optical device sealing portion 30 (refer to FIG. 2 and FIG. 5) is formed. In the present invention, the optically transmissive material is softer than the housing 23, and a silicone is preferable as the optically transmissive material. The silicone covers the respective optical device packaging portions 29, whereby the optical device sealing portion 30 is formed. When the optical device sealing portion 30 is formed, the manufacture of the optical semiconductor component 22 is completed.

With regard to the silicone, those from a soft type (rubber-like) to a hard type (resin-like) in terms of hardness are present, and in the present invention, the soft-type one is used. In such a way, a stress to a bonding wire and the like can be relieved. An effect of this will be described later.

Figure 5:
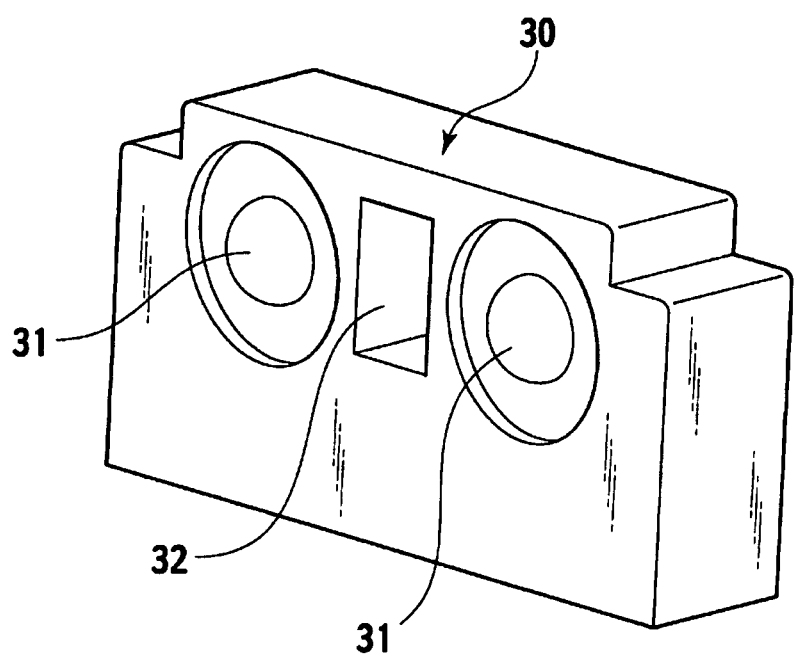
FIG. 5 is a perspective view of an optical device sealing portion.

As shown in FIG. 2 and FIG. 5, convex lens portions 31 and a through hole 32 are formed in the optical device sealing portion 30. The convex lens portions 31 are individually formed into a semi-spherical shape in front of the optical devices 26 and 27. In forming the optical device sealing portion 30, it is preferable that the convex lens portions 31 is formed so that the optical devices 26 and 27 can be located on optical axes thereof. Moreover, in forming the optical device sealing portion 30, it is preferable that a distance between the convex lens portions 31 and the optical devices 26 and 27 is set in consideration for a curvature and focal length of the convex lens portions 31. For example, the optical device sealing portion 30 is formed so that the optical devices 26 and 27 can be arranged on focal points of the convex lens portions 31. The through hole 32 is provided between the respective convex lens portions 31, and is formed so as to penetrate the optical device sealing portion 30 from the front thereof to the rear thereof. When a material of the housing 23 is filled into the through hole 32, a light shielding portion is formed, thereby optically shielding between the optical devices 26 and 27. In such a way, a crosstalk between the optical devices 26 and 27 can be prevented.

As shown in FIG. 2, the housing 23 is integrally molded to the optical device sealing portion 30 of the optical semiconductor component 22 so as to cover the optical device sealing portion 30. In the present invention, a liquid crystal polymer is preferable as a material of the housing 23. By the integral molding using the liquid crystal polymer, the optical device sealing portion 30 is covered with the housing 23, and the manufacture of the housing-integrated optical semiconductor component 21 is completed.

The optical semiconductor component 22 is put into a second metal mold (not shown). The liquid crystal polymer is filled into the second metal mold, and the optical semiconductor component 22 and the liquid crystal polymer are integrally molded to each other, whereby the housing 23 is formed. Specifically, the optical semiconductor component 22 is put into the second metal mold in a state of fixing the leg portions 28, and the liquid crystal polymer is filled into the second metal mold, whereby the optical semiconductor component 22 and the liquid crystal polymer are integrally molded to each other. Since the leg portions 28 to be fixed have high dimensional accuracy, dimensional accuracy of the housing-integrated optical semiconductor component 21 is also increased in the integrally molding, thus making it possible to align optical axes of an optical connector inserted into the housing 23 with high accuracy and the optical semiconductor component 22 with each other.

The liquid crystal polymer has low melt viscosity. Hence, even if an injection pressure at the time of injection molding is set to be low, it is possible to mold the housing 23 with a complicated shape as illustrated. Moreover, even in such a molding step of disposing, in the housing 23, the optical device sealing portion 30 made of the soft-type silicone, it is possible to mold the optical device sealing portion 30 without deforming a shape thereof.

A supplementary description will be made of such resin molding. The vicinity of a resin inlet (gate) receives a high injection pressure, and in general, becomes a place where the silicone is the most prone to be deformed. However, in the present invention, the liquid crystal polymer having the above-described advantage is used, thus making it possible to freely dispose the inlet on the periphery of the silicone or on other places. Moreover, in the product, a position where the injected resin finally contacts to itself (so-called welded portion) on a position of the inlet, and it becomes possible to control the position of the welded portion in combination. In the welded portion, resins are bonded to each other when resin curing progresses to some extent, and accordingly, bonding strength thereof is weak. Such a positional control of the welded portion is important in order to obtain sufficient strength of the housing 23.

Note that, by transfer molding, it takes three minutes to mold the light emitting-side FOT 11 and the light receiving-side FOT 12 (refer to FIG. 5) in the conventional example. Meanwhile, in the present invention, it is possible to shorten such a molding time to one minute by using liquid injection molding (LIM). In such a way, many effects will be exerted. For example, it also becomes possible to reduce power consumption at the time of the molding.

In the present invention, epoxy resin is not used, but the silicone having a smaller bending modulus and expansion coefficient than those of the epoxy resin is used. Hence, in a reliability test, in particular, in a test such as a temperature cycle in which a temperature change is large, a stress applied to the Au wire by heat shrinkage of the resin can be relieved. Specifically, the stress applied to the Au wire is proportional to difference between linear expansion coefficients of a member existing around the Au wire and a member connected to the Au wire. Therefore, the stress can be expressed as a product of a bending modulus of the member existing around the Au wire and difference between the linear expansion coefficients as described above. In an environment from −40 degrees Celsius to +105 degrees Celsius, bending moduli of the epoxy resin and the silicone are 326.3 and 40.79, respectively, and linear expansion coefficients thereof are $6.5*10^{-5}$ and $20*10^{-5}$, respectively. In the same environment, a linear expansion coefficient of the lead frame is $1.4*10^{-5}$, then, in the case of the epoxy resin, the stress is expressed as: $1664.13*10^{-5}$ (kg/mm$^2$)=$326.3*(6.5*10^{-5}-1.4*10^{-5})$. As opposed to this, in the case of the silicone, the stress is expressed as: $758.694*10^{-5}$ (kg/mm$^2$)=$40.79*(20*10^{-5}-1.4*10^{-5})$. Hence, in comparison with the case of using the epoxy resin, in the case of using the silicone, the stress to the Au wire becomes approximately a half, and reliability of the product is enhanced.

Figure 2B:
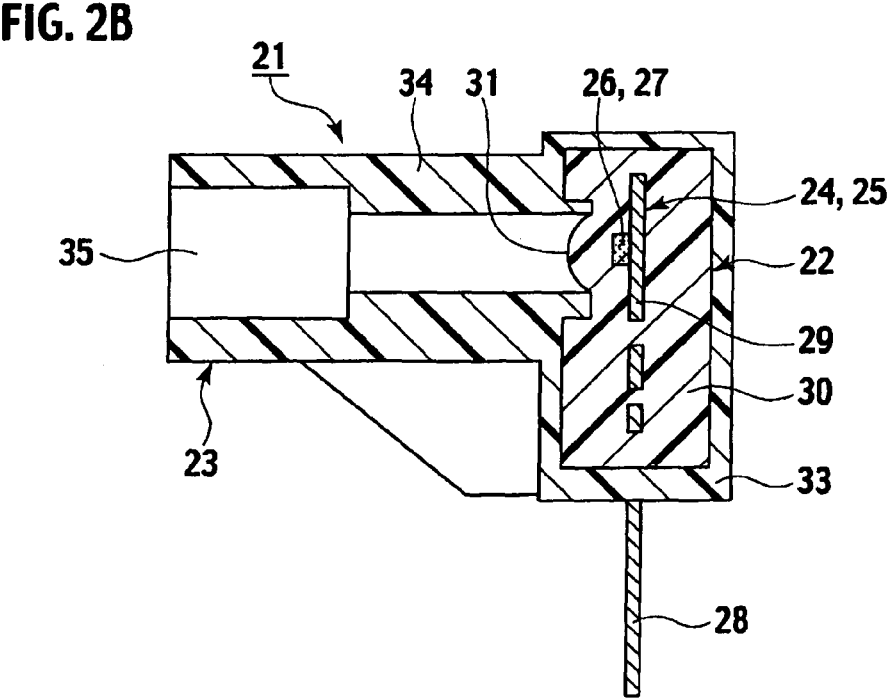
FIG. 2B is a cross-sectional view of the housing-integrated optical semi-conductor component shown in FIG. 2A.

The description returns to the housing 23. As shown in FIGS. 2A and 2B, the housing 23 includes: a body portion 33 that builds therein the optical device sealing portion 30 of the optical semiconductor component 22 and exposes the leg portions 28; and a ferrule connection cylinder portion 34 continuous with the body portion 33. In the ferrule connection body portion 34, a pair of ferrule insertion holes 35 into which ferrules (not shown) of optical fiber terminals are inserted are formed. As shown in FIG. 2B, the pair of ferrule insertion holes 35 are formed so that inner walls thereof can have step differences. End portions of the insertion holes 35 are formed so as to correspond to the positions of the convex lens portions 31 of the optical device sealing portion 30. Note that the ferrule connection cylinder portion 34 is preferably formed so that axes of the insertion holes 35 can coincide with the optical axes of the convex lens portions 31. In this case, optical axes of optical fibers (not shown) inserted into the insertion holes 35 coincide with the optical axes of the convex lenses 31, and light outputted from the optical fibers is efficiently condensed to the optical devices 26 and 27. Note that, though not particularly shown, an attachment hole for attaching a holder (for example, the holder 10 of the conventional example, which is shown in FIG. 1) thereto may be provided in the housing 23. Moreover, the housing 23 may be formed into such a shape that is covered with a shield case (for example, the shield case 13 in the conventional example, which is shown in FIG. 1).

As described above while referring to FIG. 2 to FIG. 5, in accordance with the present invention, the optical semiconductor component 22 and the housing 23 are integrally molded to each other, thus making it possible to reduce the number of components assembled as the product, and to thereby obtain high positional accuracy, that is, high optical axis accuracy. Hence, in the housing-integrated optical semiconductor component 21, high-speed and large-volume communication is enabled. The present invention can provide a manufacturing method of the housing-integrated optical semi-conductor component 21 as described above.

Besides the above, the present invention is capable of being altered and embodied in various ways within the range without changing the spirit of the present invention.

INDUSTRIAL APPLICABILITY

The manufacturing method of the present invention can provide the housing-integrated optical semiconductor component that suppresses manufacturing cost and is usable for the high-speed and large-volume communication.

The invention claimed is:

1. A manufacturing method of a housing-integrated optical semiconductor component, comprising the steps of:
   packaging a plurality of optical devices on a lead frame having a leg portion;
   forming an optical semiconductor component by sealing a periphery of the optical devices by an optically transmissive material;
   forming a first through hole in the optical semiconductor component, the first through hole being disposed between the optical devices; and
   thereafter integrally molding a housing to the optical semiconductor component so that the housing has a second hole through which lights from/to the optical device pass, and covers the sealed portion of the optical semiconductor component formed in the sealing step,
   wherein:
      the optically transmissive material includes silicone, a material of the housing includes a liquid crystal polymer, and the optically transmissive material is softer than the housing; and
      the material of the housing is filled into the first through hole in the optical semiconductor component in the integrally molding step.

2. The manufacturing method according to claim 1, wherein the leg portion is fixed in the forming and integrally molding steps.

3. The manufacturing method according to claim 2, wherein, the forming step includes steps of: placing the optical device into a first mold, and filling the optically transmissive material into the first mold; and
   wherein the integrally molding step includes steps of: placing the sealed portion of the optical semiconductor component into a second mold, and filling the material of the housing into the second mold.

4. The manufacturing method according to claim 1, wherein, the forming step includes a step of forming a convex lens condensing lights into the optical device, the convex lens being formed of the optically transmissive material.

5. The manufacturing method according to claim 4, wherein the second through hole is an insertion hole into which a ferrule of an optical fiber terminal is inserted, the insertion hole being located in front of the convex lens.

6. The manufacturing method according to claim 1, wherein the material of the housing is opaque.

7. The manufacturing method according to claim 6, wherein the liquid crystal polymer has low melt viscosity to mold the sealed portion without deforming shape of the sealed portion.

8. A housing-integrated optical semiconductor component, comprising:
    an optical semiconductor component including:
        a lead frame having a leg portion;
        a plurality of optical devices packaged on the lead frame;
        an optical device sealing portion that seals a periphery of the optical devices by an optically transmissive material; and
        a light shielding portion embedded in the optically transmissive material and disposed between the optical devices; and
    a housing integrally molded to the optical semiconductor component, the housing having a second hole through which lights from/to the optical device pass, and covering the optical device sealing portion,
    wherein:
        the optically transmissive material includes silicone, a material of the housing includes a liquid crystal polymer, and the optically transmissive material is softer than the housing; and
        the light shielding portion is formed of the material of the housing.

9. The housing-integrated optical semiconductor component according to claim 7, wherein the optical device sealing portion includes a convex lens condensing light into the optical device, the convex lens being formed of the optically transmissive material.

10. The housing-integrated optical semiconductor component according to claim 9, wherein the second through hole is an insertion hole into which a ferrule of an optical fiber terminal is inserted, the insertion hole being arranged in front of the convex lens.

11. The housing-integrated optical semiconductor component according to claim 7, wherein the material of the housing is opaque.

12. The housing-integrated optical semiconductor component according to claim 11, wherein the liquid crystal polymer has low melt viscosity to mold the sealed portion without deforming shape of the sealed portion.

* * * * *